United States Patent Office 3,135,540
Patented June 2, 1964

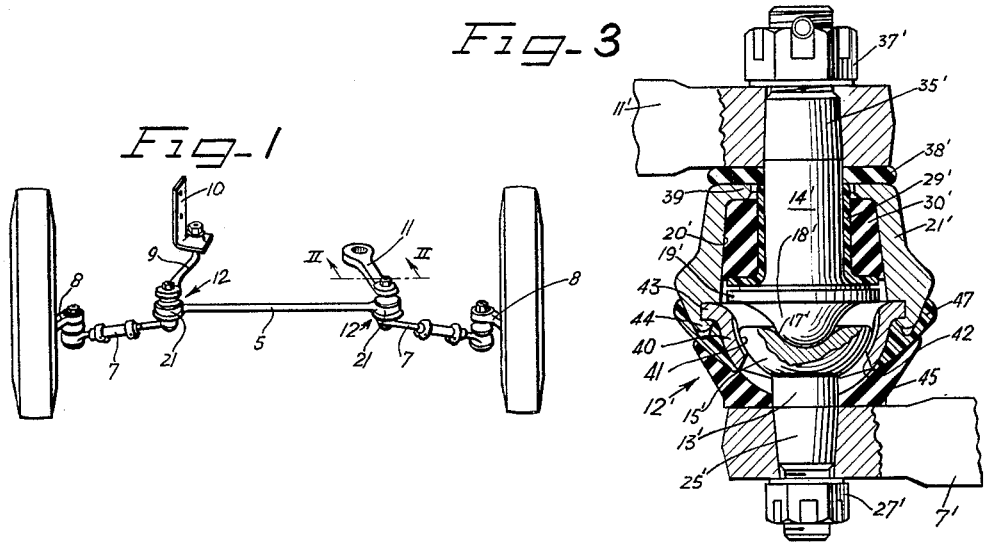
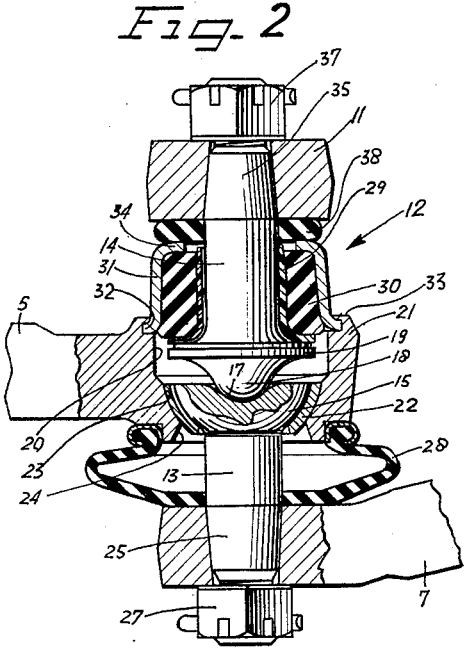
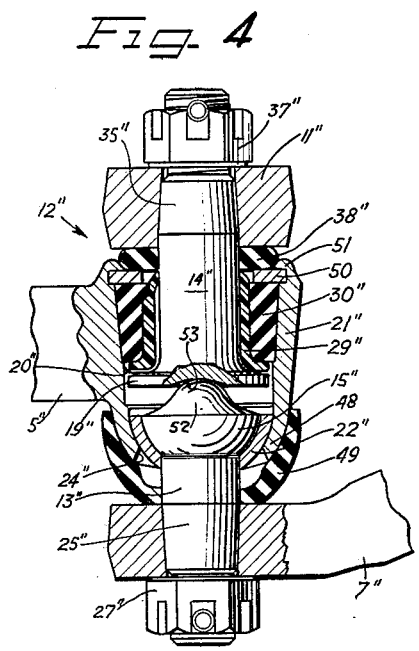

3,135,540
ARTICULATED DUAL STUD LINKAGE JOINT
Edward J. Herbenar, Detroit, Mich., assignor to Thompson Ramo Wooldridge Inc., Detroit, Mich., a corporation of Ohio
Filed Apr. 24, 1962, Ser. No. 189,906
1 Claim. (Cl. 287—87)

This invention relates to improvements in joint construction of the ball joint type and more particularly concerns a novel dual stud arrangement especially suitable for connecting in a single joint assembly three linkage members having diverse rotary and oscillatory relative movements in service.

Heretofore it has been deemed necessary in linkage systems, such as the parallelogram steering linkage of the type utilized on the large majority of automotive vehicles, to connect all ends of component links to companion links by individual joints. The reason for this has been that while certain connections or joints of such a linkage system, as for example those located on the center link or cross link and joining the respective ends of the pitman and idler arms thereto, are subject to primarily only rotary motion, those joints which connect the tie rods with the cross link are subject to both rotary and oscillatory motion. In service all of these motions may occur repetitively and simultaneously under conditions of greatly variable relative stresses, as is well known in relation to steering linkages of automotive vehicles.

Further, each of the several joints is liable to some tolerance play or looseness and wear. Each joint must also receive individual attention as to lubrication. Due to the number of individual joints in a steering linkage assembly, undesirable restrictions have been heretofore placed upon location of the steering point for proper steering geometry. In such as assembly there has also been substantial overlapping of links, and undesirable crowding of the tie rod pivots toward the center of the cross link and possible interference with the frame, engine and other components of the vehicle.

According to the general objects and features of the present invention, the foregoing and other deficiencies and disadvantages are overcome by the provisions of a new and improved articulated dual stud linkage joint construction whereby three links having diverse rotational and oscillatory requirements in operation can be connected through one joint.

Another object of the invention is to provide a novel articulated dual stud ball joint type connector.

A further object of the invention is to provide a joint connector which will take the place of and perform the functions of two separate prior connectors.

Still another object of the invention is to reduce the number of joints required to connect together the links of a linkage system and thus reduce the number of wearing parts and surfaces, reduce the number of joints requiring lubrication, and reduce the efficiency losses due to necessary tolerances and thus the amount of looseness or play in the system.

A still further object of the invention is to provide a linkage system which is easier to fabricate, requires less parts to perform the same functions and is generally improved over prior similar linkage systems.

Yet another object of the invention is to provide a new and improved joint structure enabling the reduction in the number of joints in a steering linkage system and affording greater latitude in the arrangement and location of the linkage connections, and especially in the location of the steering point for proper steering geometry.

It is also an important object of the invention to provide a new and improved articulated dual stud linkage joint connector in which the studs are generally coaxially related in mutual bearing relation within a common socket.

Other objects, features and advantages of the present invention will be readily apparent from the following detailed description of certain preferred embodiments thereof taken in conjunction with the accompanying drawing, in which:

FIGURE 1 is a perspective view of an automobile steering linkage embodying features of the invention;

FIGURE 2 is an enlarged fragmentary vertical sectional elevational detail view taken substantially on the line II—II of FIGURE 1;

FIGURE 3 is a sectional elevational detail view similar to FIGURE 2 but showing a modification; and FIGURE 4 is a similar view but showing a further modification.

Upon reference to FIGURE 1, it will be observed that the steering linkage shown comprises the customary arrangement of links including a center link or cross link 5, respective tie rods 7 connected to steering arms 8 on the respective wheels. In addition, there is an idler arm 9 at one side of the linkage pivotally connected to a bracket 10 which is arranged to be secured fixedly to the frame of an associated vehicle. At the opposite side of the linkage is a pitman arm 11 adapted to be operatively connected to the steering unit of the vehicle.

What sharply distinguishes the illustrated linkage is that instead of there being the customary four joints on the cross link 5, there are only two such joints 12, and each of such joints is located on one of the respective end portions of the cross link and performs a dual function. At one end of the cross link 5 the joint 12 connects both the adjacent tie rod 7 and the idler arm 9. At the opposite end of the cross link 5 the joint 12 operatively connects the tie rod 7 and the pitman arm 11.

Although according to prior practice a type of connection was utilized between the cross link and the idler arm and the pitman arm which would permit primarily only rotary relative motion between the arms and the link, and the individual connection between each of the tie rods and the cross link were of a type that would permit both rotary and oscillatory motion, the single, dual function joint or connector 12 of the present invention, although effecting the connection of one of the arms and one of the tie rods adjacent thereto in a single joint, affords means for the diverse rotary and oscillatory requirements of the arm and tie rod connection to the link at each of the joints 12. To this end, referring to FIGURE 2, each of the joints 12 includes a pair of oppositely extending studs 13 and 14 having an articulated connection, desirably comprising a universal bearing relationship between a segmental spherical bearing head 15 on one end of the stud 13 provided with a concave central bearing socket or depression 17 complementary to a generally convex central bearing protuberance 18 on an enlarged radially flanged bearing head 19 on one end of the stud 14. These bearingly coactive heads are contained operatively within a generally cup-shaped socket 20 of a housing 21 forged on the end portion of the cross link 5. Through this arrangement, just two of the sockets 21, one located on each end of the cross link 5 afford all the sockets required for the steering linkage, instead of the customary four joint sockets heretofore deemed necessary.

Substantial oscillations as well as rotary movement of the stud 13 are enabled by virtue of its segmental spherical bearing head 15 riding in a complementary generally cup-shaped bearing liner 22 riding in a mating semi-spherical bearing surface 23 provided in the socket 20, and an ample end opening 24 from the socket through the adjacent end of the housing 21 from which the stud 13 projects. Therefore, this stud is well adapted for connection to the associated tie rod 7. A free outer end portion 25 on the stud 13 is tapered and threaded and extends through a complementary attachment bore in the end portion of the tie rod 7 and is secured to the tie rod as by means of a castellated nut 27 and the usual cotter pin. Preferably a flexible seal 28 which may be of the boot type is mounted on the housing 21 about the stud 13 and the opening 24.

In a preferred arrangement, the stud 14 is mounted in a manner to perform substantially according to the disclosure in Patent 2,778,664 issued January 22, 1957, being readily rotatable and being restrained to a limited range of angular movement. To this end, a flanged bearing sleeve 29 of a plastic material having a low coefficient of friction, even when dry, such as high molecular weight polyamides (nylon), polyethylene plastic, and the like, is disposed about the stud and on the adjacent surface of the head flange 19, and is engaged by an oil-resistant rubber sleeve 30 which is pre-loaded within a housing container 31 to substantially resist and limit both axial and transverse or angular movements of the stud 14. The construction and arrangement is such that the container housing 31 with the stud 14, its bearing liner 29 and the loaded rubber sleeve 30 are adapted to be assembled as a unit and then assembled with and attached to the joint housing 21 after the stud 13 and its bearing liner 22 have been assembled within the socket 20. For this the housing container 31 has a radially outwardly flaring end flange 32 secured by a peened or spun-over end flange 33 on the end of the housing 21 about the opening therefrom opposite to the opening 24. On its opposite end the container housing 31 has an inturned retaining flange 34 confining the contiguous end of the loaded sleeve 30.

The described construction and mounting of the stud 14 especially adapts it for joining the pitman arm 11 (or the idler arm 9) to the cross link 5. For such attachment the stud 14 has a tapered and threaded free end portion 35 extending through and secured to the arm member as by means of a castellated nut 37 and customary cotter pin. A resilient sealing washer 38 is engaged about the stud 14 and compressed between the attachment eye portion of the arm 11 and the container housing flange 34.

In FIGURE 3, the modification illustrated is of a dual stud joint 12', the function and purpose of which is substantially the same as the described joint 12, and the structure of which in the vital details is so similar, that where there is substantial identity of structure primed reference numerals will be used to identify similar parts and the description of such parts in relation to the form of FIGURE 2 will be understood to apply with equal force and effect. Primarily, the joint structure 12' differs from the joint structure 12 in that while the joint structure 12 is disclosed as a top loading type, the joint 12' is a bottom loading type. That is, the joint mechanism housed within the joint socket is loaded from the lower end of the socket instead of from the upper end of the socket. To this end, the socket housing 21' has overlying and partially closing the upper end of the socket 20' a radially inturned flange 39 retainingly engaging the upper end of the loaded rubber sleeve 30' while leaving sufficient clearance about the stud 14' and the upper end of the bearing sleeve 29' to permit the limited range of lateral, angular movement of the stud which, as shown, is attached on its upper tapered end threaded free end portion 35', as by means of the castellated nut 37' to the arm 11', with the sealing resilient washer 38' compressed between the attachment eye portion of the arm and the flange 39.

In partially closing relation to the lower open end of the socket 20' is a generally cupped hardened bearing stamping 40 providing a semi-spherical concave bearing surface 41 receptive of the semi-spherical bearing surface of the stud head 15' of the stud 13' which projects down through an opening 42 in the bearing ring member 40 of sufficient size to enable ample oscillatory movement of the stud 13' in service. At its upper end, the bearing member 40 has a radially outwardly projecting attachment flange 43 which is secured to the housing 21' by means of a peened or spun-over lower end attachment flange 44.

On its tapered and threaded free end portion 25', the stud 13' is attached to the attachment eye portion of the tie rod 7' as by means of the castellated nut 27', and a resilient generally cup-shaped seal 45 cooperating slidably with a synthetic plastic spacer and seal bearing surface member 47 provides a seal about the stud 13' and the opening 42.

Within the concave bearing depression 17' of the stud head 15' opposingly bears the semi-spherical projection 18' centrally on the flange head 19' of the stud 14'. This arrangement, similarly as described in connection with the joint 12 permits relative rotational movement of the studs 13' and 14', relative oscillating movement of the stud 13', and limited axial and lateral displacement movement of the stud 14'.

In the modification of FIGURE 4, a dual stud joint assembly 12" is depicted which, similarly as the joint assembly 12 of FIGURE 2 is of the top loading type, and since the function and purpose are the same and most of the elements of structure are substantially the same, double primed reference numerals identify similar parts and the more detailed description afforded in connection with FIGURE 2 will be understood to apply equally to such parts. One structural difference over the joint assembly 12 of FIGURE 2 resides in that the housing 21" of the cross link 5" is of a deep forged socket construction providing an integral depending lower end partially closing semi-spherical bearing flange 48 complementary to and supporting the bearing liner 22" for the segmental spherical swivel bearing head 15" of the stud 13". The bearing flange 48 provides the lower opening 24" from the socket 20". The stud 13" projects down through the opening 24" and has its free tapered and threaded end 25" secured to the attachment eye of the link 7" by means of the castellated nut 27". A sliding seal 49 engages about the stud 13" and slidably engages the outer semi-spherical surface of the flange 48.

At its upper end, the socket is partially closed by a retainer ring plate 50 which is secured in place, after the stud assembly has been loaded into the socket 20" by a peened or spun-over securing flange 51 on the upper end of the housing 21". This retainer ring plate 50 confines the loaded resilient sleeve 30" and has a sufficiently large central opening to accommodate the stud 14" therethrough and the upper end of the bearing liner sleeve 29". The closure ring disk 50 also seats the resilient sealing washer 38" which is compressed thereagainst by the attachment eye portion of the arm 11" secured to the tapered and threaded end portion 35" of the stud 14" by the castellated nut 37".

Furthermore, in the joint assembly 12", bearing connection between the studs within the socket 20" is effected by a generally semi-spherical bearing projection 52 centrally from the top of the stud head 15", bearingly engaged in a central downwardly opening bearing socket 53 in the head flange 19" of the stud 14". In operation, the stud 13" can rotate and oscillate throughout a substantial range relative to the stud 14", and the latter can rotate freely and have limited axial and lateral displacement movement as enabled by the structure and more particularly by the articulated bearing connection 52, 53.

In all forms of the invention disclosed, long useful life with an initial lubricant supply is afforded by the thoroughly sealed construction and the protection of the internal, working parts of the joint against entrance of foreign matter.

Further, in all forms of the invention a dual stud joint is provided which, in a single socket of not much greater length, and no greater diameter provides by means of the dual studs all of the functions heretofore performed by two separate joints requiring two separate sockets. This is made possible by the mutual opposed bearing relationship articulating the heads of the studs within the socket. Contributing to this desirable relationship and avoiding any necessity for additional spring means for take-up purposes, is the loaded rubber sleeve about the primarily rotatable stud which by virtue of its axial loading and thus axial thrust from the retainer overlying its outer end imparts axial thrust of such stud toward the companion rotatable and oscillating stud, thereby maintaining the articulating bearing connection of the studs in good bearing opposition and taking up and compensating for any wear that may occur on the opposed bearing surfaces of the stud heads after long service.

In addition, of course, the rubber ring or sleeve permits limited axial and lateral resiliency of the joint by relative slight separating movement of the studs under lateral loads, enabled by riding of the opposed projection and bearing socket surfaces of the articulating bearing connection. Under such loads, as during steering movements, the projection can ride slightly up the sloping side of the bearing socket within the limits permitted by loading of the substantially confined sleeve member which quickly "stiffens" to the point of zero yieldability due to its confinement and thus precludes mushy force transmission between the arm and cross link and the associated tie rod.

Both of the studs, while mutually coacting in the joint assembly by virtue of their opposed articulating bearing relationship, function freely in their respective manners in service.

In the exemplary forms of the joint disclosed the few features of dissimilarity may be freely interchangeably adapted from one form to the other to meet requirements of design, cost factors and preferences.

It will be understood that modifications and variations may be effected without departing from the scope of the novel concepts of the present invention.

I claim as my invention:

A dual stud ball joint construction suitable for connecting in a single joint three members capable of rotational and oscillatory movements, comprising a socket housing which may comprise a part of one of the members and opens in opposite directions, a pair of studs having heads in said socket housing and respectively projecting from the opposite ends of the socket housing and having means for respective connection to the remaining members, the head of one of said studs providing a semi-spherical bearing engaging a complementary bearing afforded within one end of the socket housing, the second stud having a head flange against which thrusts a resilient solid elastomeric sleeve loading member confined by a flange on the opposite end of the socket housing and thrusting the second stud toward said one stud, characterized by one of said stud heads having a bearing depression and the other of said heads having a bearing projection slidably engaged in the bearing depression, said bearing depression having its side profile shaped to enable eccentric relative displacement by lateral movement of said other head by riding along said side relative to said one stud head accompanied by simultaneous axial movement of the second stud in a direction away from said one stud and also accompanied by compression resistance of said loading member as a result of the eccentric and axial relative displacement of the bearing depression and projection, with the effect that the resilient loading member is stiffened to the point of zero yieldability to preclude mushy force transmission between the members.

References Cited in the file of this patent

UNITED STATES PATENTS

| | | |
|---|---|---|
| 2,049,502 | Hufferd et al. | Aug. 4, 1936 |
| 2,461,626 | Booth | Feb. 15, 1949 |
| 2,479,339 | Gair | Aug. 16, 1949 |
| 2,614,862 | Alldredge et al. | Oct. 21, 1952 |
| 2,827,303 | Herbenar | Mar. 18, 1958 |
| 2,934,350 | Herbenar | Apr. 26, 1960 |

FOREIGN PATENTS

| | | |
|---|---|---|
| 612,646 | Canada | Jan. 17, 1961 |
| 1,001,078 | France | Oct. 17, 1951 |